USSR Patent [19]

Breimer et al.

[11] Patent Number: 4,513,319
[45] Date of Patent: Apr. 23, 1985

[54] METHOD FOR AUTOMATICALLY SETTING UP A TELEVISION CAMERA

[75] Inventors: Hendrik Breimer, Breda, Netherlands; Frederik J. Van Roessel, Upper Saddle River, N.J.; Engbert Tienkamp, Breda, Netherlands

[73] Assignee: U.S. Philips Corporation, New York, N.Y.

[21] Appl. No.: 448,657

[22] Filed: Dec. 10, 1982

[30] Foreign Application Priority Data

Dec. 30, 1981 [NL] Netherlands ............... 8105897

[51] Int. Cl.³ ............................................. H04N 9/04
[52] U.S. Cl. ..................................... 358/163; 358/217
[58] Field of Search ..................... 358/163, 217, 221; 315/370

[56] References Cited

U.S. PATENT DOCUMENTS 3,743,772  7/1973  Pieters et al. .................. 358/163
4,234,890 11/1980  Astle et al. ..................... 358/10
4,285,004  8/1981  Morrison et al. ................ 358/10

Primary Examiner—Gene Z. Rubinson
Assistant Examiner—Robert Lev
Attorney, Agent, or Firm—Marc D. Schechter

[57] ABSTRACT

Method for automatically setting up a television camera by means of a microcomputer. The setup is effected in two separate steps, a test pattern being used in each step. An external test pattern is present on a test chart in front of the camera and an internal test pattern is present in the camera in the optical path between a camera lens system and a camera pickup arrangement. During the setup with the internal test pattern, the lens system is optically blocked and correction information is stored in a memory. During or after the setup with the external test pattern, the correction information associated with the internal test pattern is subtracted from the correction information associated with the external test pattern. The resulting correction difference information is lens correction information and is stored in a memory associated with the lens system. Now, the camera operator can prepare for scene recording without an external The internal test pattern in the camera memory and the lens memory together produce the correction for an optimum setup.

5 Claims, 1 Drawing Figure

METHOD FOR AUTOMATICALLY SETTING UP A TELEVISION CAMERA

BACKGROUND OF THE INVENTION

The invention relates to a method for automatically setting up a television camera by means of a test pattern. The optical information originating from the test pattern is converted by a pickup arrangement in the camera into electronic information. The electronic information is compared in at least one microcomputer with reference information to produce difference. information. The difference information is converted as an error information into correction information which is stored in a camera memory. The correction information is extracted from the camera memory and used to correct picture information supplied by the pickup arrangement, resulting in minimal information. The invention also relates to a television camera suitable for the method, to a suitable memory and lens system, and to a suitable memory.

Such a method is disclosed in U.S. Pat. No. 4,285,004 (Morrison, et al), in which the test pattern present on a test chart is positioned in front of a color television camera. The optical information originating from the test chart is imaged via an optical path incorporating a lens system and a color splitting prism, onto the pickup arrangement which comprises three pickup devices. Each device produces a color video signal. After the setup, scan correction signals are applied to two of the pickup devices or to all three pickup devices. As a result, of an optimum raster registration is obtained in the television picture on display. In addition, during the setup shading errors at black level and the maximum video value are corrected and a gamma correction is obtained by applying correction signals to video signal processing circuits.

In practice, setting up a television camera by means of a test chart which is to be positioned at some distance in front of the camera is very troublesome for the camera operator. Positioning the test chart, which must always be at hand, in the proper position and under the proper illumination is time-consuming and annoying for the camera operator.

SUMMARY OF THE INVENTION

It is an object of the invention to provide a camera setup method in which, in normal circumstances, the camera operator does not need to set up a test chart in front of the camera during the preparation for scene recording.

According to the invention, a setup method which precedes the normal preparations for scene recording includes two separate steps in which an external and an internal test pattern are used separately. During the setup with the external test pattern, the external test pattern is present on a test chart in front of the camera. During the setup with the internal test pattern, the internal test pattern is present in the camera in the optical path between a lens system of the camera and the pickup arrangement. The separate setups with the external and internal test patterns are effected with a non-blocked optical path and a blocked optical path, respectively in which the lens system is incorporated.

At least the correction information associated with the internal test pattern is stored in the camera memory. The correction information associated with the internal test pattern is substracted from the correction information associated with the external test pattern, and the resulting correction difference information (which relates to at least the lens system) is stored in a lens memory. The camera memory and lens memory together produce the correction information for correction with minimal error.

In the described method the setup is effected in two steps. In normal circumstances, the camera operator needs to setup only the internal test pattern contained in the camera. This internal test pattern may be arranged in the optical path between the (optically blocked) lens system and the camera pickup arrangement in the form of a hingeable slide which is illuminated from a light source. Alternatively, this slide may be projected into the optical path by means of a mirror.

Prior to the present invention each lens system for the camera required a separate setup by means of the external test pattern to be positioned in front of the camera. The difference between the correction information associated with the different lens systems and determined by means of the external test pattern, and the correction information associated with the internal test pattern is stored by the supplier in a like number of, for example, digital lens memories. As a result each lens system had its own lens memory with correction information.

For setting up the camera during preparation for (i) to scene recording, the camera operator now only needs to place the lens memory associated with the lens system in the camera or to choose one of the incorporated memories, (ii) to block the optical path containing the lens system, and (iii) to position the test pattern present in the camera in the illuminated optical path, in order to make the automatic setup operative. When the setup is fully automatic, the camera operator needs only to operate one single knob at the camera.

The described method accomplishes a separation of functions. For each lens system, a setup with the external and internal test patterns needs to be performed only once, and the associated lens memory is loaded with the correction difference information. Thereafter during use of the camera only the internal test pattern in the camera is required for setup.

The loading of the memory associated with the lens system may be performed by the lens system supplier or by the camera operator himself. In addition, if so desired, the lens memory information may be refreshed at intervals so that ageing phenomena in the lens system is corrected.

The lens memory may be, for example, a digital memory. To form the correction information associated with the lens system, the correction information associated with the external test pattern provided on the test chart may be temporarily stored in an auxiliary memory. This has the advantage that the loading of the lens memory need not to be performed simultaneously with the generation of the correction information associated with the test chart pattern. Because of the temporary storage the correction difference information can be formed at a desired, arbitrary moment by the microcomputer. Thereafter the auxiliary memory may be erased.

In addition to the fact that in the described method the lens memory contains the correction information associated with the lens system, this memory may contain further correction information as regard errors in the blocked portion of the optical path in which the lens system is incorporated.

The method according to the invention can be used with a television camera having a camera memory employed by the camera operator during the setup operation which is part of the preparation for scene recording. The camera also has a lens memory containing a correction information which is at least associated with the lens system used at that moment at the camera. When the camera is suitable for studio and outdoor recordings and the required lens systems have been supplied with the camera, the fact that a lens system with range extension features has a different characteristic than the same lens system without this feature is taken account of. It appears that eight lens memories for storing of the different items of correction information is sufficient.

A memory and lens system based on the use of a method according to the invention can be supplied to the user of the camera. After the lens system has been arranged at the camera and the lens memory with the correction information associated with the lens system has been arranged at the microcomputer or a choice between the incorporated memories has been made, the camera operator can perform the setup with the internal test pattern.

In practice, the related lens systems and lens memories with correction information will be provided with identification features, either electronic features or nonelectronic features.

The method results in a memory containing correction information which fits in with the associated lens system for a color television camera. During recording, the color television camera operates, for example, with the green, red and blue light components of the light coming from a scene to be televised. The digital lens memory may contain correction information about, for example, geometry, registration or raster registration, shading distortion, optical focussing and the video signal. The geometry correction is either of the pincushion type or of the barrel type, and may be characterized by one single coefficient in the digital memory. The optical focussing correction may be written in the memory with three coefficients. When the registration error is expressed as a dimensional error in red and blue with respect to green, two coefficients are required for correction. The shading distortion can be corrected by means of, for example, a horizontal and vertical, parabolic and sawtooth-shaped correction in red, green and blue, so that twelve coefficients are required in the lens memory. Higher order corrections result in more coefficients. For the video signal correction, red and blue amplifying and black level corrections, which require four coefficients, may be used.

With the described automatic setup by means of the external and internal test patterns, the external test chart pattern can be setup automatically or manually. The external and internal test patterns must be of identical construction. When a television camera user buys a memory and lens system in which the lens memory has already been loaded, a matching internal test pattern may be used in the setup by the camera operator.

DESCRIPTION OF THE PREFERRED EMBODIMENTS

Figure 1:
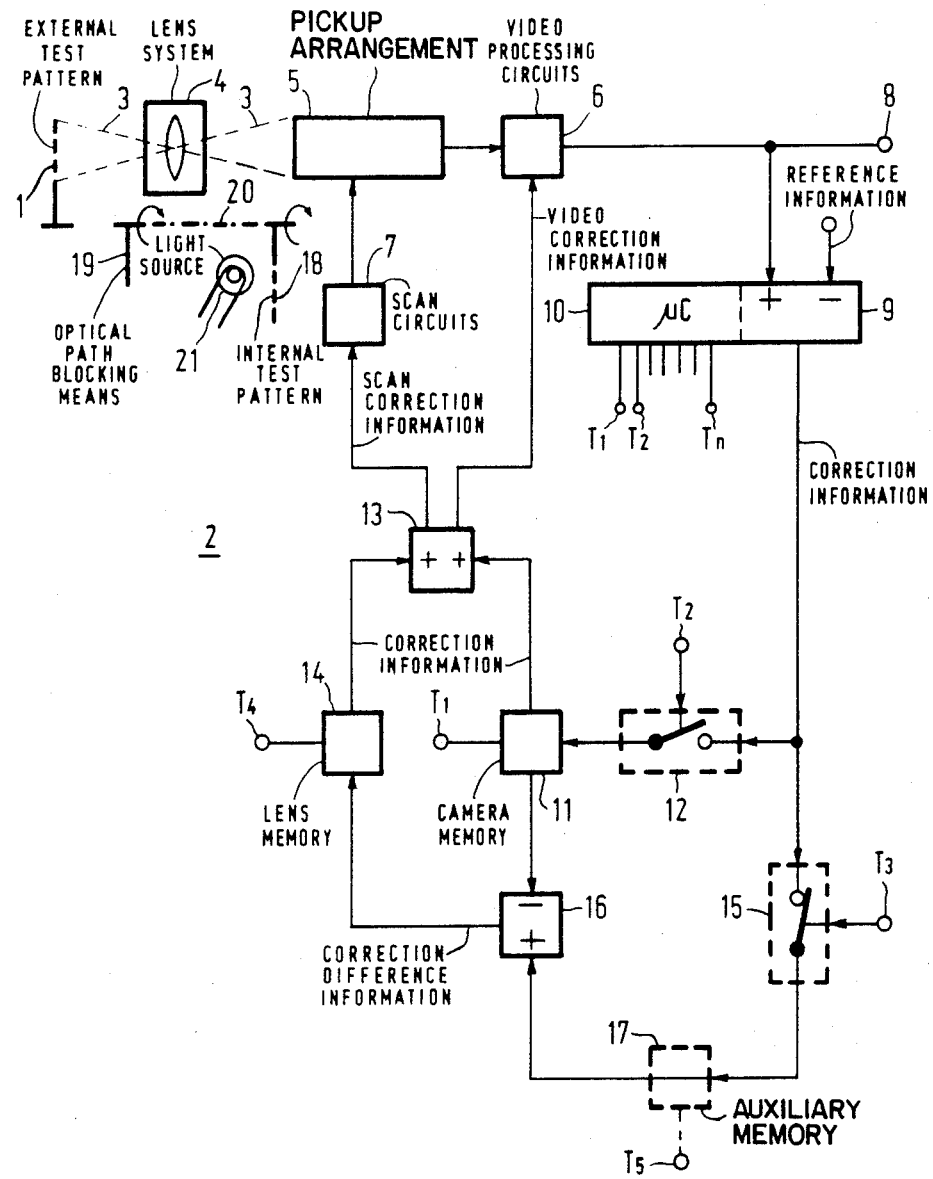
FIG. 1 is a schematic diagram of a camera according to the invention.

In FIG. 1 there is shown an external test pattern 1 present on a test chart which is positioned in front of a television camera 2. The optical information originating from the test chart is imaged on a pickup arrangement 5 via an optical path 3 incorporating a lens system 4. The pickup arrangement 5 converts the optical information into electronic information which is applied to video processing circuits 6. The conversion is effected under the control of scan circuits 7. An output of the video processing circuits 6 is connected to an output 8 of the camera 2.

For automatic setup of the camera 2, the output of the video processing circuits 6 is connected to a (+) input of a stage 9 having a (−) input to which reference information is applied. Stage 9 is combined with a microcomputer (μC) 10. Output/input terminals of the microcomputer 10 are denoted by T1, T2 to Tn. By means of the stage 9 and the microcomputer 10 the difference information present between the (+) and (−) inputs is converted as error information into correction information at an output.

The stage 9 applies the correction information to an input of a camera memory 11 through and on/off switch 12. The camera memory 11 has a control input/output connected to the terminal T1 of the microcomputer 10. A switching input of the switch 12 is connected to the output terminal T2 of the microcomputer 10. An output of the camera memory 11 conveying correction information is coupled to inputs of the video processing circuits 6 and the scan circuits 7. According to an aspect of the invention this coupling comprises an adding circuit 13. The adding circuit 13 has two (+) inputs connected to the output of the camera memory 11 and a lens memory 14, respectively.

The output of the stage 9 with the correction information is coupled to an input of the lens memory 14 through an on/off switch 15 and a subtracting circuit 16. The switch 15 has a switching input connected to the terminal T3. The lens memory 14 has a control input/output connected to the terminal T4. The substracting circuit 16 has a (+) input connected to the switch 15 and a (−) input connected to an output of the camera memory 11. As described, an auxiliary separate memory 17 may be provided between the output of the stage 9 and the (+) input of the subtracting circuit 16 which has a control input/output connected to the terminal T5.

In order to produce the correction difference information in that the subtracting circuit 16, an internal test pattern 18 and an optical path blocking means 19 are provided in the camera 2. A (mechanical) coupling 20 is shown in the FIGURE. The internal test pattern 18 may be in the form of a hingeable slide which is illuminated from a light source 21. The blocking means 19 may alternatively be provided between the lens system 4 and the hingeable slide.

In FIG. 1 the switch 15 is shown in the closed state. During this state the information coming from the external test pattern 1 is processed in the camera 2 in the described way. Prior to this state the internal test pattern 18 was inserted in the optical path 3 behind the lens system 4, the optical path 3 being blocked by the optical path blocking means 19. In this prior state the switch 12 was closed. The result is that setup achieved in the described two steps.

What is claimed is:

1. A method of producing lens system correction information for automatically setting up a television camera, said television camera having a lens system and a pickup arrangement on an optical path, said method comprising the steps of:

viewing an internal test pattern with the television camera to produce an internal test pattern correction signal, said internal test pattern being viewed by blocking light from entering the lens system and by placing the internal test pattern in the optical path between the lens system and the pickup arrangement;

storing the internal test pattern correction signal in a camera memory;

viewing an external test pattern with the television camera to produce an external test pattern correction signal, said external test pattern being viewed through the lens system;

subtracting the internal test pattern correction signal from the external test pattern correction signal to produce a lens system correction signal representing lens system correction information; and storing the lens system correction signal in a lens memory.

2. A method as claimed in claim 1, further comprising the step of temporarily storing the external test pattern correction signal in an auxiliary memory.

3. A method of automatically setting up a television camera, said camera having a pickup arrangement producing a raw picture signal, said camera also having a camera memory containing an internal test pattern correction signal and a lens memory containing a lens system correction signal produced as claimed in claim 1, characterized in that the method comprises the steps of:

adding the internal test pattern correction signal to the lens system correction signal to produce a picture correction signal; and correcting the raw picture signal with the picture correction signal to produce a corrected picture signal.

4. A television camera capable of being set up by the method of claim 3, said television camera comprising:

a camera memory containing an internal test pattern correction signal; and a lens memory containing a lens system correction signal for the lens system of the camera.

5. A television camera as claimed in claim 4, further comprising:

means for placing the internal test pattern in the optical path between the lens system and the pickup arrangement; and means for selectively blocking light from entering the lens system.

* * * * *